Figure 1:
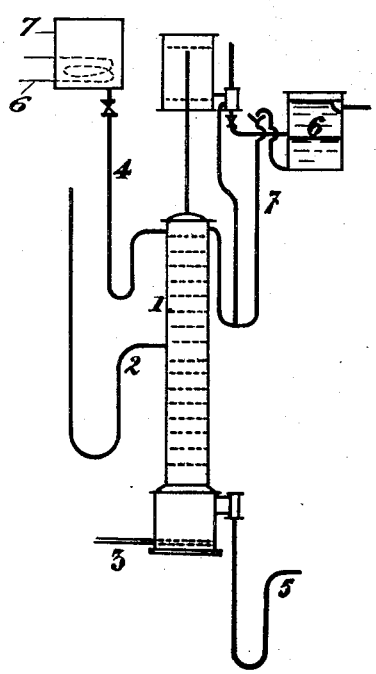

Oct. 10, 1933.        E. RICARD ET AL        1,929,901
PROCESS FOR THE SEPARATION OF LIQUIDS

Filed Dec. 31, 1928

Patented Oct. 10, 1933

1,929,901

UNITED STATES PATENT OFFICE 1,929,901

PROCESS FOR THE SEPARATION OF LIQUIDS

Eloi Ricard and Henri Martin Guinot, Melle, France, assignors to Societe Anonyme Des Distilleries Des Deux-Sevres, Melle, France Application December 31, 1928, Serial No. 329,540, and in Belgium January 26, 1928

5 Claims. (Cl. 202—42)

The problem of the separation of organic liquids miscible in water in all proportions, from organic liquids which are only slightly soluble, or even insoluble in water, often occurs in industrial operations.

For example, the case may be cited of mixtures of ethyl alcohol and acetal which are obtained in preparing the latter product by the action of acetaldehyde on alcohol in the presence of catalyzers. The acetal gives with the alcohol and also with water and alcohol azeotropic mixtures rich in acetal, boiling at a temperature very little lower than that of pure alcohol, so that the separation of alcohol and acetal is practically impossible by ordinary distillation.

Also, the acetal is not sufficiently insoluble in pure water and especially in alcoholic water, to be separated conveniently by the simple addition of water to the mixture followed by decantation and one or more washings. The separation of acetal and alcohol is rightly regarded as extremely difficult.

Many analogous examples might be given.

However, the case is very different when the liquid is mixed with a large quantity of a product which is perfectly insoluble in water; it is then easy to separate the latter by the simple addition of water, decantation and washings. This is so in the case of a mixture of alcohol and petrol, for example. But in the case in which the mixture to be treated contains considerable quantities of a liquid miscible in water, and only contains small quantities of liquids which are not miscible, the addition of water obviously gives no result, and leads to a difficult problem. This happens in the case of alcoholic worts and phlegms which contain small quantities of products insoluble or only slightly soluble in water, such as:

Ethyl acetate, aliphatic aldehydes, acetals, crotonaldehyde, various esters, the higher alcohols, furfurol, etc.

In order to separate these different products, the usual rectification process requires a large expenditure of steam although the total quantity of impurities rarely exceeds 1 per cent. Also, it should be noted that in order to eliminate them entirely, it is necessary to withdraw them in a large quantity of alcohol, which necessitates numerous subsequent operations in order to recover the alcohol as far as possible. The problem is then only solved in an expensive and imperfect manner.

The present invention consists in a practical method which permits of the quantitative separation of the mixtures of organic liquids miscible in water, such as the methyl, ethyl and isopropyl alcohols, acetone, etc., with organic liquids which are only slightly soluble or are insoluble in water, and are mixed in any proportion.

This method consists in introducing the mixture to be treated at the centre of an ordinary distillation column, which is heated at its lower part and at the upper end of which a current of hot water is supplied, preferably raised to the temperature of the mixture at the minimum boiling point formed by the water and the slightly soluble liquid to be separated.

The water spray, the rate of flow of which can be varied within wide limits, although it should be a function of the quantity of liquid miscible with water contained in the mixture to be treated, forms an impassable barrier for the vapours of the miscible liquid which otherwise would have a tendency to rise to the top of the column. On the other hand, the vapours of the liquid which is only slightly soluble in water are not stopped by this barrier.

This double result is due to two facts. On the one hand, the liquid which is entirely miscible with water gives off vapours which are more or less rich according as the liquid which produces them is itself stronger or more dilute.

On the other hand, the water insoluble liquids on boiling in the presence of water produce vapours of constant composition, whatever may be the composition of the liquid which gives rise to them, and this is true so long as the two constituents are present together. With liquids that are not perfectly insoluble in water, this law does not apply quite rigorously, but in ordinary practice it can be considered as sufficiently approximate.

Consequently, the spraying effected at the top of the column does not sensibly affect the concentration of the water insoluble substances in the vapours which rise, while, on the other hand, at each plate the quantity of the liquid miscible in water diminishes, so as to be practically zero at the top of the column. It is eliminated at the lower part of the column in the form of a dilute solution which can be treated in the usual manner, while the water insoluble liquid is collected at the upper part after having been decanted.

The process is applicable to any mixtures of organic liquids which are miscible with water and of organic liquids which are not miscible with water. It can be carried out also at pressures other than atmospheric.

In the drawing, Fig. 1 is a view of one embodiment of the apparatus.

Figure 2:
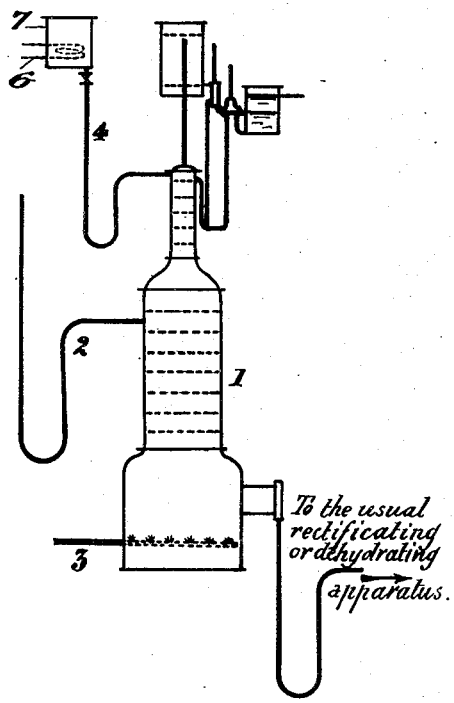

Fig. 2 illustrates a modified form of apparatus. Some examples will explain the mechanism of the invention.

*Example I.*—It is assumed that ethyl acetate is to be separated from alcohol in a mixture consisting of:—

| | Parts |
|---|---|
| Ethyl acetate | 70 |
| Alcohol | 25 |
| Water | 5 |

Ethyl acetate, water and alcohol give by distillation an azeotrophic mixture boiling at 70.3° C. (Wade, Chem. Soc. 87, p. 1665). Ethyl acetate and alcohol give an azeotropic mixture, boiling at 71.8° C. containing 69.4 per cent of acetate.

Finally, the water and the acetate give a mixture of which the minimum boiling point is 70.45° C.

These different characteristics make the ordinary distillation impossible for the separation of the elements of the mixture. Ordinary washing with water is equally impracticable, for the solubility of ethyl acetate in water, which is about 10 per cent at +20° C., increases very rapidly with the content of alcohol in the washing water.

To solve the problem, the mixture to be treated is admitted (Fig. 1) by a pipe 2 into a column provided with plates 1 and heated by steam jets. At the top of the column, a volume of water almost equivalent to the volume of liquid treated is admitted by the pipe 4, this water being previously raised to 73° C., as by a heating coil 6 in water-supply tank 7.

In the usual action, the ethyl acetate alone traverses the plates disposed above the feed pipe 2, while the alcohol is displaced to the lower part, where it can be extracted by the tube 5 in the form of a solution of about 25 per cent, which is concentrated by the usual known processes.

The mixture to be treated is preferably fed in the form of vapours rather than in the form of liquids, since the heat to be provided at 3 at the base of the column is then less and the effect of the concentration of the alcohol produced by this heating is less important and consequently offers less opposition to the main effect produced by the spraying. Consequently, there is a definite increase in the output of the operation.

The vapours arriving at the top of the column are condensed and led into a decanting device 6; the upper layer consists of pure hydrated ethyl acetate, the lower layer is returned continually to the top of the column by the pipe 7. No by-product is obtained.

*Example II.*—Acetal and alcohol are to be separated from a mixture consisting of:

| | Per cent |
|---|---|
| Acetal | 30 |
| Alcohol | 60 |
| Water | 10 |

Ordinary distillation and washing with water are incapable of producing the separation. THe operation is carried out as in the preceding example and with identical apparatus. The spraying water is preferably raised to a temperature of 85° C., the boiling point of a mixture of acetal and water of constant composition.

*Example III.*—The purification of alcoholic worts is to be effected at 5° Gay Lussae containing the usual water insoluble impurities of alcohol. In ordinary distillation, the greater portion of these impurities remains with the alcohol. The wort to be treated being preferably raised to the boiling temperature is supplied (Fig. 2) by the tube 2 in a special purifier 1 heated at the lower end by steam jet 3. The spraying water supplied by the tube 4 is raised to 98° C. In consequence of the very small quantity of the impurities contained in the wort, a very small quantity of this is vaporized. Consequently, the diameter of the portion of the column above the supply tube 2 is considerably reduced. Also, the water insoluble impurities are obtained in a very concentrated form and the purified wort discharged at the lower portion of the column and afterwards treated in the usual manner gives a particularly pure alcohol with a reduced consumption of steam.

*Example IV.*—To separate the isopropyl ether and the isopropyl alcohol from a mixture consisting of:—

| | Per cent |
|---|---|
| Isopropyl ether | 80 |
| Isopropyl alcohol | 20 |

The isopropyl ether boils at 60° C. It is impossible to obtain the separation of isopropyl alcohol by simple distillation. By ordinary washing with water, the yields are extremely small.

In order to effect the separation quantitatively, an apparatus is used which is identical in all ways with that of Example I.

The spraying water is raised to a temperature of 62° C., the boiling point of the azeotropic mixture isopropyl ether and water. At the lower portion of the column a mixture of isopropyl alcohol and water is collected which is recovered by ordinary distillation.

As previously stated, the process can be carried out at pressures other than atmospheric.

*Example V.*—The separation of a mixture of furfurylic alcohol (soluble in water) and furfurol (insoluble in water) is nearly impracticable by the previously known rectification process as the respective ebullition points thereof are very near to one another (168° C. and 162° C.) The method according to the present invention makes possible an easy and quantitative separation. But furfurylic alcohol is known to be sensible to the action of a long heating when in the presence of water, as it is partially converted to resin; so we prefer operating in a partial vacuum in a way to lower the ebullition temperature of the mixture. For instance, by using a vacuum of 200 mm, we obtain as a head product the binary mixture furfurol-water, boiling at 67° C., while the liquid flowing from the bottom of the column is an aqueous solution of furfurylic alcohol free from furfurol and wherefrom furfurylic alcohol may be easily separated.

*Example VI.*—Where two liquids which are very volatile, whereof the former, e. g. acetaldehyde is soluble and the latter is insoluble, e. g. isopentan (B. P. 30–31° C.), the operation can not be made atmospheric pressure as sensible losses would be experienced. We overcome the difficulty by operating under a suitable super-atmospheric pressure, in an inert atmosphere, so that the vapor temperature in the top part of the column may be increased and that an easy condensation may be produced. It is obvious that, even for a well-determined example, the necessary pressure can not be precisely set forth as it essentially depends upon the condensation available surface as well as upon the cooling water temperature.

From the foregoing it will be apparent that in certain cases operation under positive pressures makes possible the separation of liquids which could not be economically or practically separated by working under normal conditions, and that in other cases operation under reduced pressures has a like advantage.

What we claim is:

1. A process for separating into their components mixtures of organic liquids miscible with water with organic liquids which are insoluble or slightly soluble in water, which comprises feeding the mixture to be separated into the middle part of a distillation zone, while spraying into the upper part of said zone a current of hot water sufficient to carry the water-soluble part of the mixture to the base of said zone, from which this part is withdrawn, while the part insoluble or slightly soluble in water is evolved as vapors and removed from the top of the zone.

2. A process for separating into their components mixtures of organic liquids miscible with water with organic liquids which are insoluble or slightly soluble in water, which comprises feeding the mixture to be separated into the middle part of a distillation zone, while spraying into the upper part of said zone a current of hot water at approximately the temperature of the mixture having a minimum boiling point and a constant composition which is formed by the water and the liquid which is insoluble or slightly soluble in water, whereby the water soluble part of the mixture is carried down to the base of said zone, while the part insoluble or slightly soluble in water is evolved as vapors and taken off from the top of the zone.

3. A process for separating into their components mixtures of organic liquids miscible with water with organic liquids which are insoluble or slightly soluble in water, which comprises feeding the mixture to be separated, in the state of vapor, into the middle part of a distillation zone, while spraying into the upper portion of said zone a current of hot water to prevent the passage of the vapors of the water-soluble part of the mixture, while the vapors of the part of the mixture insoluble or slightly soluble in water are taken off from the top of the zone.

4. Process for separating liquids miscible with water from liquids insoluble or slightly soluble in water, consisting in feeding the mixture to be separated into the middle part of a distillation zone, in heating the base of the said distillation zone and in spraying a current of water into the upper portion of the distillation zone, in collecting the vapours of the azeotropic mixture of water and the liquid insoluble or slightly soluble in water which escape at the upper part of the said zone, in condensing these vapours in order to obtain a liquid which separates into two layers, in separating the layer containing liquid which is insoluble or slightly soluble in water and a little water, in returning into the distillation zone the other layer of liquid, and in collecting at the base of the distillation zone a mixture of the liquid miscible with water, and water.

5. Process for purifying alcoholic worts containing impurities insoluble in water, which consists in raising the worts to the temperature of boiling, in feeding them into the middle portion of a distillation zone, heating this distillation zone at the lower end, spraying into the upper part of the distillation zone a stream of water raised to a temperature of about 98° C., collecting the vapors which reach the upper part of the distillation zone, condensing them to obtain a liquid which separates into two layers, decanting one of the layers which contains the impurities, returning the other layer to the distillation zone, and collecting at the base of the distillation zone the dilute alcohol which is freed from impurities.

ELOI RICARD.
HENRI MARTIN GUINOT.